United States Patent
Waters et al.

(10) Patent No.: US 6,293,302 B1
(45) Date of Patent: Sep. 25, 2001

(54) OVERFLOW PROTECTION VALVE ASSEMBLY

(76) Inventors: Michael Waters, c/o 782 Church Rd., Elgin, IL (US) 60123; Chan Yet, 6A Eredine, 38 Mount Kellet, Hong Kong (HK)

(*) Notice: Subject to any disclaimer, the term of this patent is extended or adjusted under 35 U.S.C. 154(b) by 0 days.

(21) Appl. No.: 09/362,791

(22) Filed: Jul. 28, 1999

Related U.S. Application Data

(63) Continuation-in-part of application No. 09/039,663, filed on Mar. 16, 1998, now Pat. No. 6,076,546.

(51) Int. Cl.[7] .......................... F16K 31/14; F16K 31/26; F16K 33/00
(52) U.S. Cl. .................. 137/390; 137/442; 137/446; 141/198
(58) Field of Search ................... 137/413, 414, 137/434, 442, 443, 444, 446, 390; 141/198

(56) References Cited

U.S. PATENT DOCUMENTS

| | | | |
|---|---|---|---|
| 2,504,638 | * | 4/1950 | Browning .......................... 137/446 |
| 4,064,907 | * | 12/1977 | Billington et al. .................. 137/446 |
| 4,142,552 | * | 3/1979 | Brown et al. ........................ 137/446 |
| 4,541,464 | * | 9/1985 | Christiansen ......................... 137/446 |
| 5,282,496 | * | 2/1994 | Kerger ................................. 137/446 |
| 5,472,012 | * | 12/1995 | Wood et al. ......................... 137/446 |
| 5,487,404 | * | 1/1996 | Kerger ................................. 137/446 |

* cited by examiner

*Primary Examiner*—George L. Walton
(74) *Attorney, Agent, or Firm*—Fitch, Even, Tabin & Flannery

(57) ABSTRACT

A valve assembly is provided which includes a valve member for being shifted between open and closed positions, and a control member having an operative position for maintaining the valve member in the open position until a predetermined fluid level is reached and an inoperative position to allow the valve member to shift to the closed position at the predetermined fluid level. The valve assembly is preferably a two-way valve for use with LP tanks to prevent overfilling thereof beyond the maximum predetermined fluid level. A float assembly rises and falls in substantial correspondence to the rising and falling of the fluid level in the vessel space, and an actuator of the fluid assembly shifts the control member at the predetermined fluid level to the inoperative position to allow the valve member to shift to the closed position for preventing further fluid intake into the vessel. The use of the control member affords advantages in terms of providing a rapid and distinct cut off of fluid flow into the tank precisely at the predetermined fluid level.

16 Claims, 9 Drawing Sheets

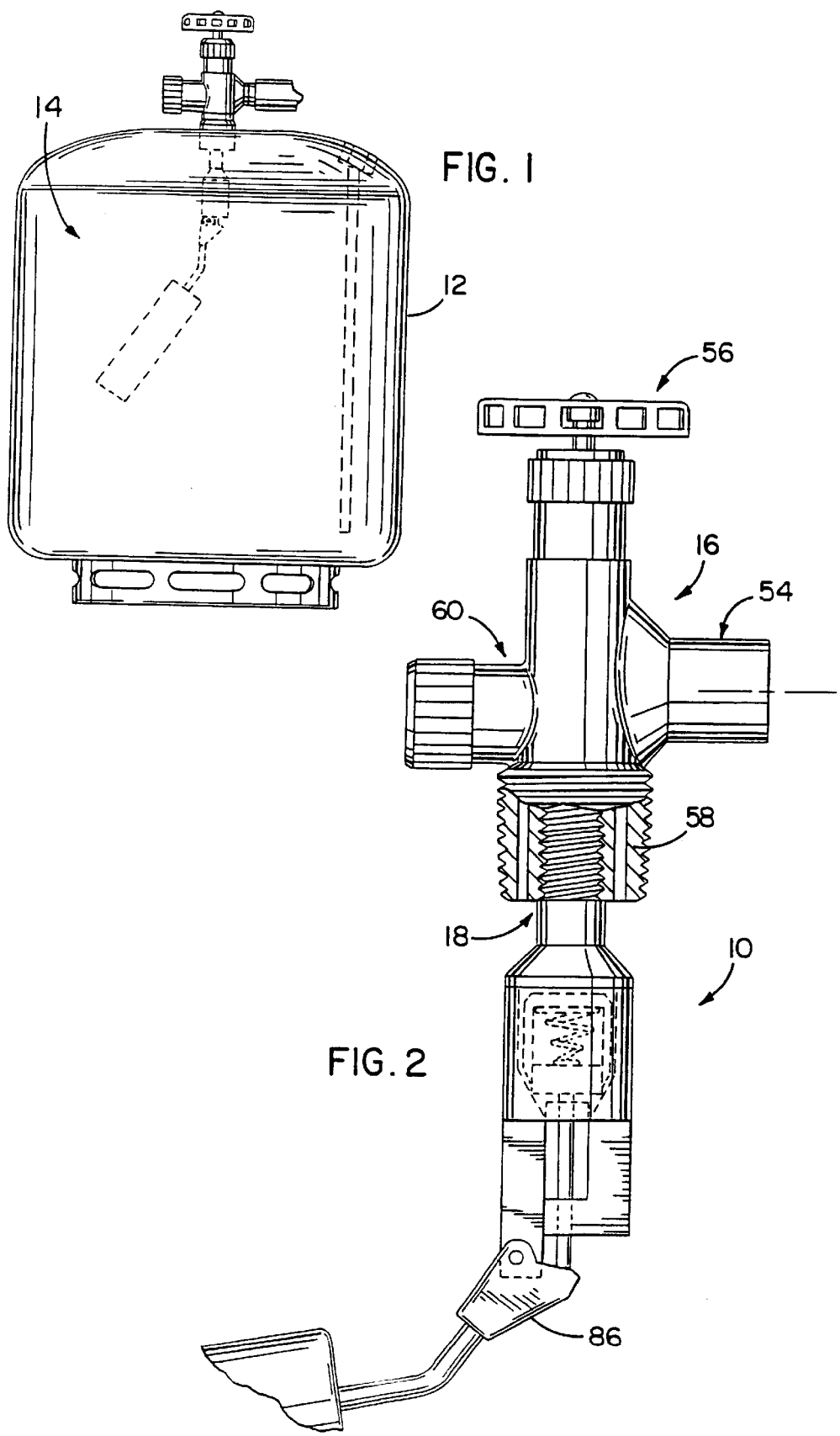

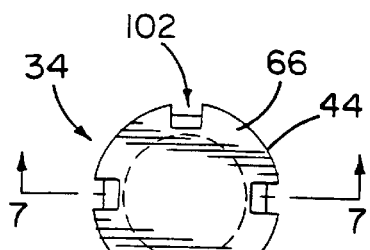
FIG. 5
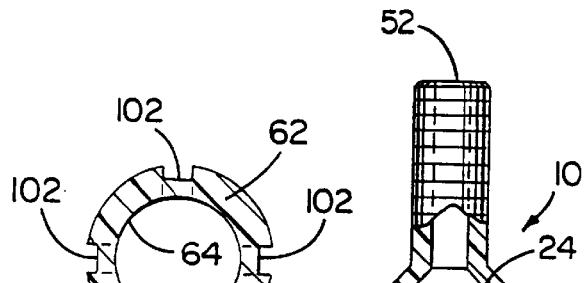
FIG. 8
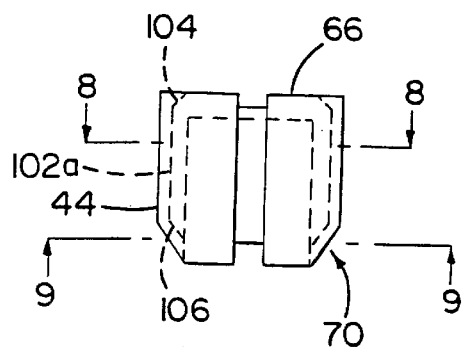
FIG. 6
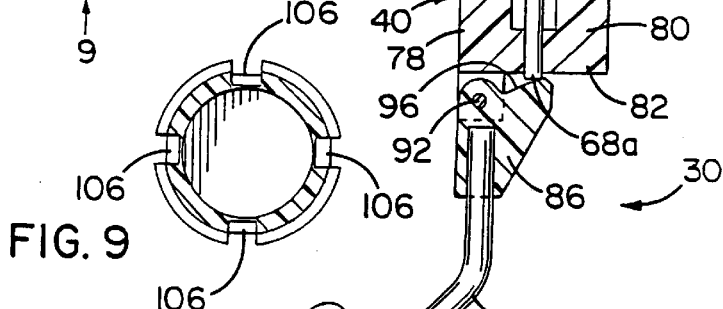
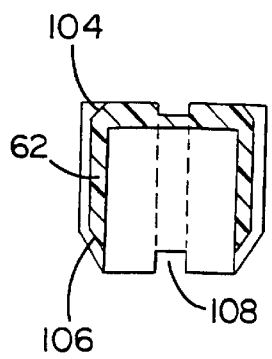
FIG. 7
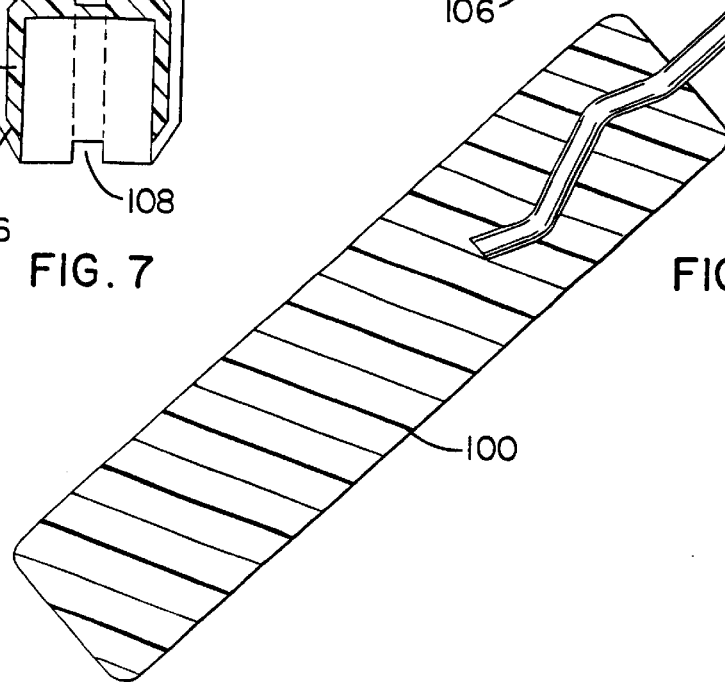
FIG. 3

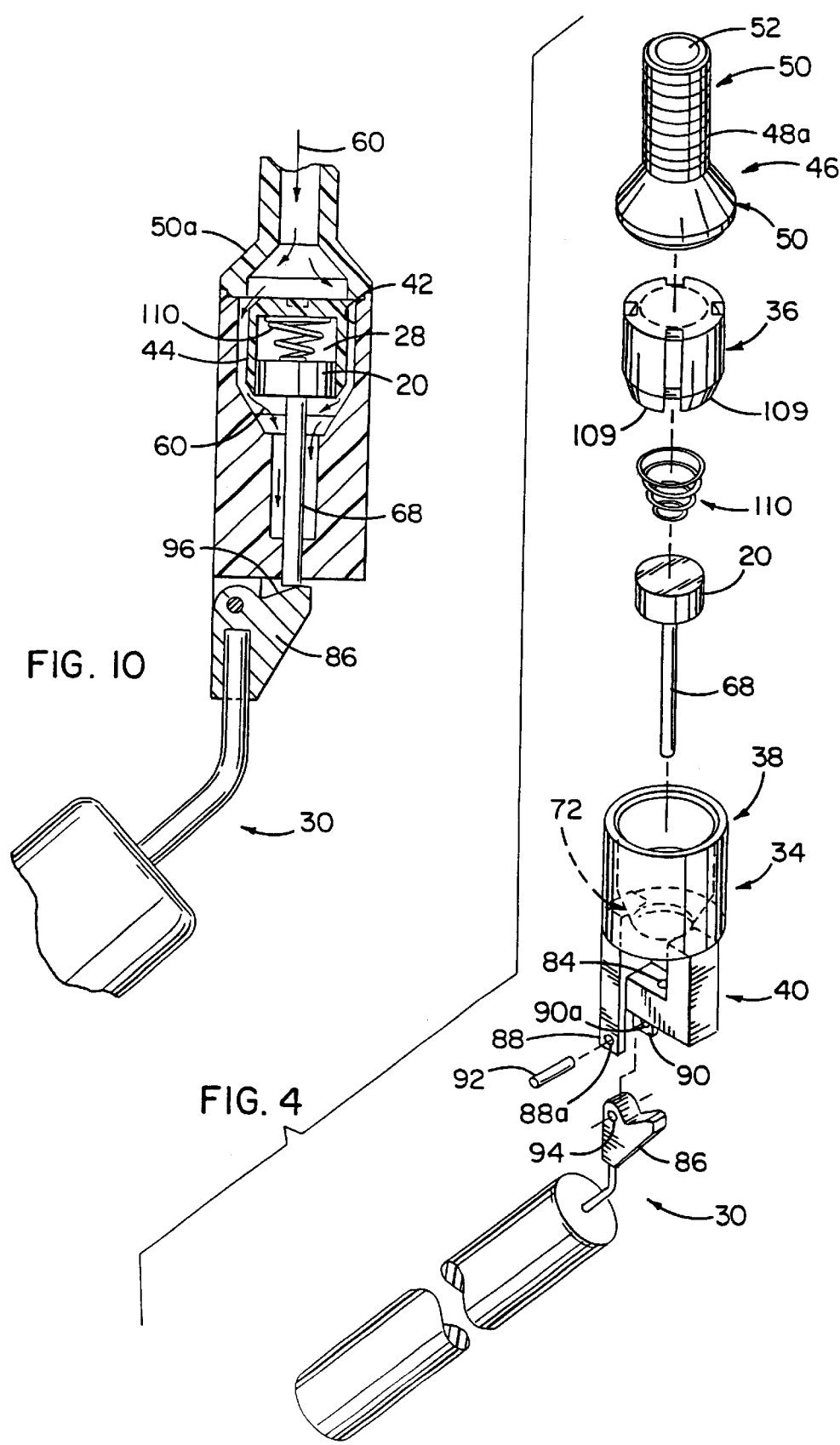

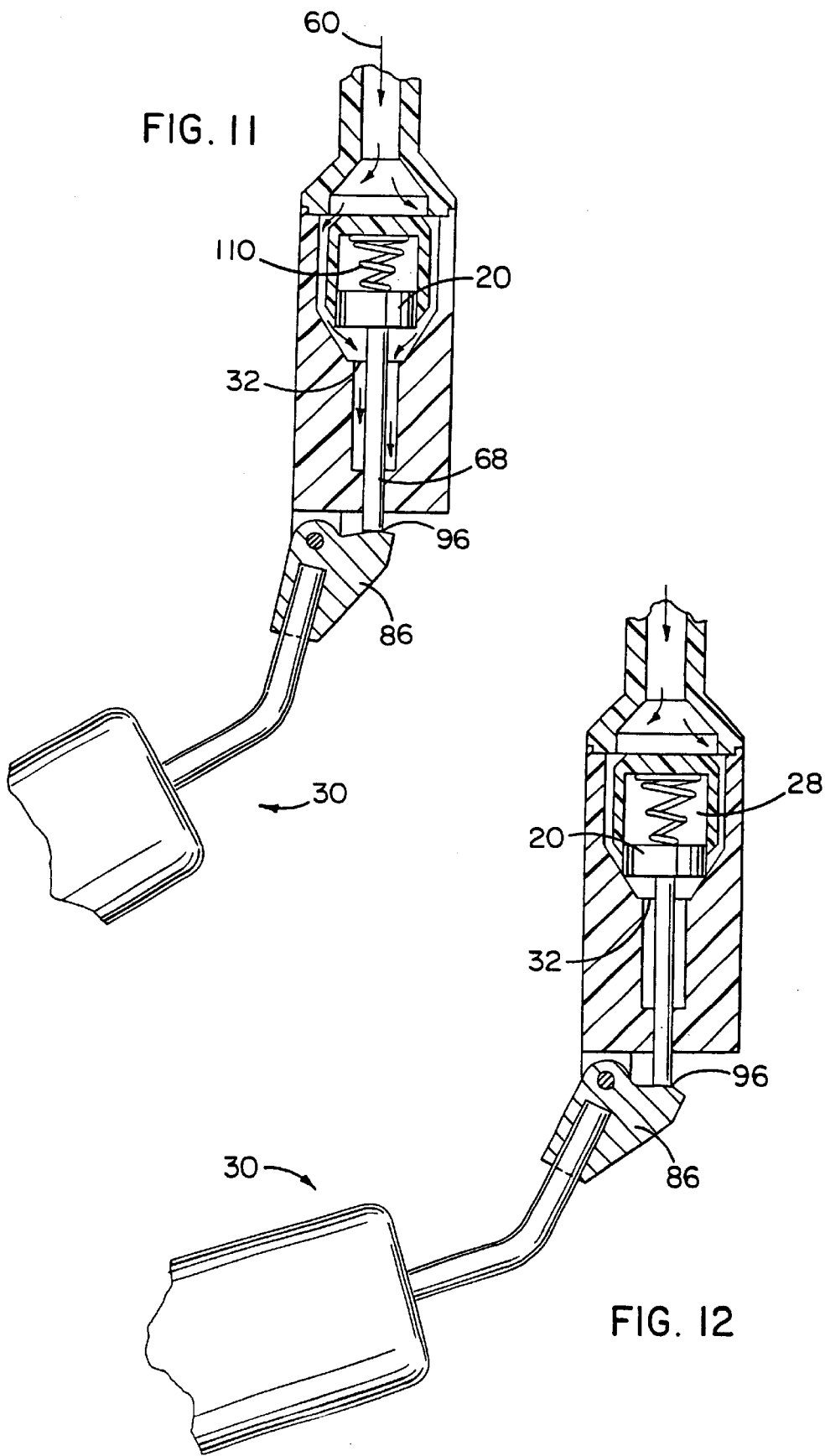

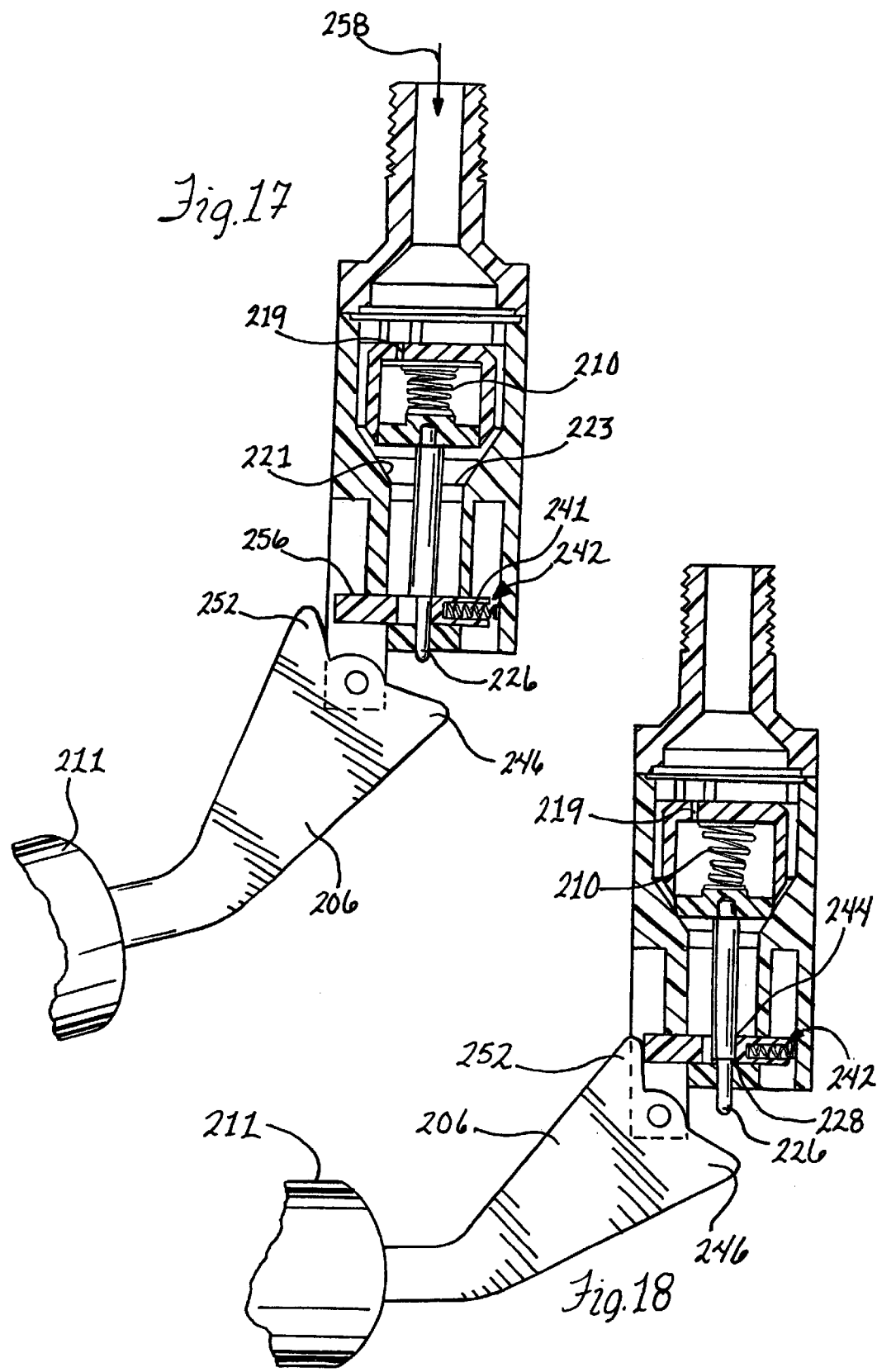

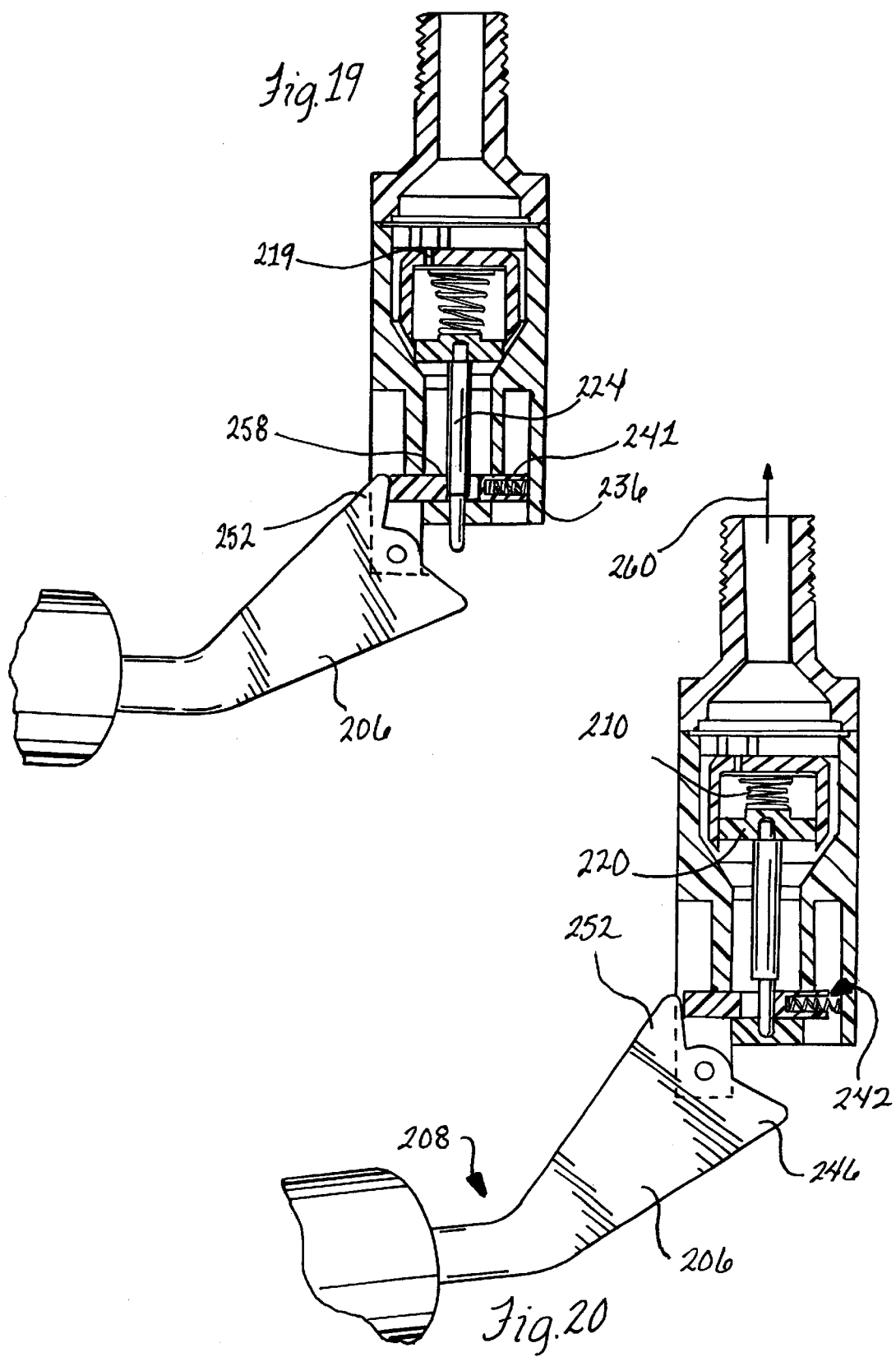

OVERFLOW PROTECTION VALVE ASSEMBLY

CROSS-REFERENCE TO RELATED APPLICATION

This application is a Continuation-in-Part of patent application Ser. No. 09/039,663, filed Mar. 16, 1998 now U.S. Pat. No. 6,076,546

FIELD OF THE INVENTION

The invention relates to a valve assembly and, more particularly, to a valve assembly for a tank that prevents filling of the tank beyond a predetermined maximum fill level.

BACKGROUND OF THE INVENTION

There have been a number of different valve assemblies designed to prevent the fluid level in tanks from exceeding a predetermined level of fluid therein. In particular, with a tank used to contain compressed or liquified gas, such as propane, it is important that the liquified gas loaded into the tank under pressure not exceed a certain fluid level in the tank so that a sufficient amount of head space at the top of the tank is maintained for safety purposes. Because of the high coefficient of thermal expansion of liquified propane gas, increases in ambient temperatures can cause the head space in the tank to be rapidly consumed. The tanks are rated so as to withstand a predetermined amount of internal pressure; however, if the tank is overfilled beyond the maximum level, there is the danger that the internal pressure may exceed the rated strength of the tank, particularly if exposed to excessive temperatures, and lead to potentially dangerous failures of the tank walls, and/or lead to dangerous expulsion of gas or liquid from a relief valve.

In this regard, it is known to provide the tanks with a dip tube that extends through the tank wall into the tank interior space to a specified level below the maximum fill level with its other end open to ambient so that once the fluid level reaches the bottom end of the tube, the liquified gas begins to be evacuated from the tank. As is apparent, if the operator who is filling the tank does not detect this condition and continues to fill the tank, a potentially hazardous situation around the tank filling station is created.

As mentioned, there have been a number of prior art devices that prevent further filling of the tank once the maximum fill level is attained. One of the problems with some of these prior valve devices is that they are not readily adapted for use with current service valves that are already in place on the tanks. In this regard, many of these valves do not allow for outgoing flow therethrough or, if they do so, only allow such reverse flow in relatively small amounts. Another shortcoming with a majority of these devices lies in their complexity, as many require a large number of different parts. For example, in a number of prior art patents, the valves utilize a primary valve member and a secondary valve member controlled by a float assembly. The primary valve blocks incoming fluid flow when the float assembly is operable at maximum fill conditions to seat the secondary valve. When the secondary valve seals its associated port, there is a fluid pressure buildup between the secondary and primary valves that pushes the primary valve onto its seat sealing lateral ports to stop fluid flow into the tank. The use of two moving valve members, and the large number of associated parts in such a valve assembly, is undesirable in terms of driving up the cost for the valve, increased time and complexity for assembly thereof, the greater likelihood of its failure under repeated cycling over time, and the ability to provide for adequate outgoing flow therethrough.

Another problem with prior valve devices is that they have trouble providing precise and repeatable fluid flow cutoff during tank loading operations once the maximum fill level in the tank is obtained. Pertinent regulations specify that a predetermined amount of head space remain above the maximum fluid level for safety purposes, as mentioned. However, with prior valve devices, the point at which they cut-off fluid intake into the tank during loading operations can vary in terms of the fluid level in the tank from the predetermined maximum fill level by as much as 1½ percent.

Accordingly, there is a need for a simpler and less expensive valve assembly that prevents overfilling of tanks beyond a predetermined fluid level therein. More particularly, it would be desirable to provide an overflow protection valve assembly that can be attached to a service valve such as on an LP tank for allowing flow into and out from the tank through the valve assembly. A valve assembly that provides more precise fluid flow cut-off at the predetermined maximum fill level would also be desirable.

SUMMARY OF THE INVENTION

In accordance with the present invention, a valve assembly is provided which stops fluid flow into a vessel at a predetermined fluid level therein, while allowing good fluid flow therethrough for filling the vessel and for discharging fluid therefrom. The preferred form of the valve assembly is for use with an LP tank for containing liquified propane gas. Thus, when the term fluid or fluid flow is utilized herein, it will be understood to encompass both the flow of compressed or pressurized gas (e.g., propane) in a fluid state, and the flow of propane in its gaseous state and combinations thereof where the liquified gas is undergoing two-phase flow depending on the relative pressures in the tank versus the pressurized filling source and/or the ambient.

The valve assembly of the present invention includes a valve member which shifts in a valve housing as controlled by the rising and falling of a float assembly as the fluid level in the vessel rises and falls. The valve member shifts into a blocking position relative to a port of the housing that communicates with the vessel interior at a predetermined maximum fill level in the vessel interior space. A fluid flow path is provided through the housing with the valve member blocking position being between the flow path and the port of the housing. When the fluid level in the vessel is below the maximum fill level, the float assembly shifts the valve member from the blocking position and keeps it removed from the flow of fluid between the flow path and the port. In this manner, the valve member is not exposed to fluid flow in the housing during filling operations of the vessel. Because the valve member is removed from the fluid flow, a substantially unrestricted flow path is provided through the valve assembly herein so as to provide a sufficiently high rate of flow into the vessel for rapid filling of the vessel such as to the maximum fill level, if desired.

In one form, the valve housing includes a seat at the port and the valve member shifts onto the seat in the blocking position at the predetermined maximum fill level with the incoming fluid flow during filling operations assisting in tightly pushing the valve member onto the seat to prevent flow through the port and into the vessel interior. Thus, while the present valve assembly keeps the valve member removed from the fluid flow during filling operations at fluid levels below the maximum fill level, the valve assembly is designed to makes use of the flow in obtaining a tight seal to prevent further flow into the vessel interior once the maximum fill level is attained.

The valve housing may include an inner member in which the valve member shifts and an outer member rigidly attached to the inner member with the flow path defined between the housing inner and outer members. The flow path can include a plurality of discrete flow paths around the housing inner member for redirecting incoming fluid around the valve member in the inner member. Each of the flow paths communicate with the port of the housing for directing incoming fluid therethrough during vessel filling operations and for receiving outgoing fluid through the port from the vessel interior during vessel unloading operations.

In another form, the flow path has a predetermined size for permitting a predetermined flow rate of fluid therethrough during filling operations to limit fluid turbulence that would keep the valve member from shifting to the blocking position at the predetermined fill level. Keeping the valve member removed from the flow of fluid through the valve assembly during filling operations allows for a good flow rate of fluid into the vessel, as previously discussed. It is also necessary to select the cross-sectional size of the flow path so that an excessive amount of turbulent flow does not develop that might prevent the valve member from shifting to the blocking position between the flow path and port at the predetermined fill level.

In a preferred form, the float assembly includes a pivotable arm and attached float of predetermined length for fitting in the vessel with the float being attached to one end of the arm which pivots the arm as the float rises and falls with the fluid level, and a cam attached to the other end of the arm for being pivoted thereby. The valve member includes a stem extending beyond the valve housing into engagement with the cam for keeping the valve member removed from the flow of fluid until the fluid in the vessel interior reaches the predetermined fill level. A biasing member is provided which urges the valve member toward the blocking position with a predetermined force for overcoming turbulence created during filling operations. The predetermined force is selected to be sufficiently low to allow the arm to pivot the cam at fluid levels in the vessel interior below the predetermined fill level so that the valve member is not in its blocking position.

Where the valve assembly is for the service valve on an LP tank designed for home use, the tank is, by necessity, somewhat limited in size so that it can be readily manipulated and moved around by the home user such as for hooking up to a gas cooking grill. While the use of a biasing member is effective to overcome turbulence that might develop during filling operations with the present valve assembly, the biasing force generated thereby must also allow the float assembly to shift the valve member out from the flow of fluid against the biasing force. With the relatively small diameter of LP tanks, the lever arm of the float assembly will be limited thereby and thus is also relatively small.

With the present valve assembly, the biasing force is coordinated with the length of the arm and float of the float assembly so that the valve member can shift to the blocking position at the predetermined fill level and can shift therefrom by operation of the float assembly at fluid levels below the predetermined fill level. The flow rate of the fluid through the flow path can be chosen so as to keep fluid turbulence to a minimum, as previously discussed, so that the bias force that must be applied to the valve member to overcome the turbulence is also minimized which, in turn, readily allows the small lever arm provided by the float assembly as afforded by the small diameter, e.g., 12 inches, of the LP tank to shift the valve member from the blocking position to allow loading and unloading of the tank.

In addition, when the service valve is opened for unloading, the pressure differential between the vessel interior and ambient must cause the valve member to shift from the blocking position. In this regard, the predetermined spring force must also be sufficiently small to allow the pressure differential to overcome the bias provided to the valve member by the small spring force to allow it to shift from the blocking position to begin tank unloading. The valve member is kept removed from the blocking position during continued unloading by operation of the float assembly, as described above.

Other ancillary benefits are provided by use of the small spring including closing the valve such as when the tank is oriented on its side or upside down. In this manner, the tank will not be overfilled even though the float assembly may not be properly operative such as with the tank in other than an upstanding orientation. In addition, should particulate matter come to rest on the valve seat around the port of the valve housing, the extra force provided by the spring bias when the valve member shifts to its blocking position will assist in dislodging this material so that it will not interfere with valve operations.

In one form, the float assembly includes a cam which pivots as the float assembly rises and falls with the vessel fluid level, and the valve member includes a stem attached thereto and extending into engagement with the cam during filling and unloading operations so that the cam is operable to shift the valve member in response to both rising and falling fluid levels in the vessel. In this manner, it is the float assembly including the cam thereof for shifting it to and from its blocking position which controls shifting of the valve member with the changing fluid levels in the vessel.

In another form of the invention, a valve assembly is provided for being connected to a service valve attached to a tank for holding liquified gas fluid in its interior at pressures greater than ambient exterior of the tank, with the liquified gas being loaded into and unloaded out from the tank interior with the service valve opened and through the valve assembly. The valve assembly includes a body affixed to the service valve and having an interior space to provide a fluid passageway therethrough between the service valve and the tank interior for loading and unloading of liquified fluid into and out from the tank. The valve member shifts in a portion of the body interior space in response to changing fluid levels in the tank interior. Flow paths are formed in the body for redirecting fluid flow through the body interior space during fluid loading operations around the portion of the space containing the valve member. A float assembly rises and falls with the fluid level in the tank interior for shifting the valve member in the body interior space portion. A port of the body is provided adjacent the flow paths with fluid flowing through the flow paths and into the port during vessel loading operations and flowing through the port and into the flow paths during vessel unloading operations. The float assembly is operable to allow the valve member to shift in a first direction to a blocking position between the flow paths and port during tank loading operations when the fluid level therein reaches the predetermined maximum fill level to stop further loading of fluid into the tank interior. The pressure differential between the tank and ambient is sufficient to cause the valve member to shift in a second direction opposite to the first direction away from the blocking position when the service valve is opened to the ambient with the tank at the predetermined maximum fill level for allowing fluid from the tank interior to flow through the fluid passageway and into and out from the service valve.

In a preferred form, the body can include an outer cylindrical portion and an inner diverter member rigidly secured in the cylindrical portion with the diverter member defining the portion of the body interior space in which the valve member is disposed. The diverter member includes opposite ends with one end being closed and the other end being open and facing the port. The flow paths are formed between the diverter member and the cylindrical portion with the valve member in its blocking position being generally at the diverter member open end so at least a portion of the valve member projects therefrom into the blocking position between the flow paths and port.

Preferably, the valve assembly body is affixed to the service valve to extend generally vertically in the interior of the tank. The fluid passageway of the body has an upper section and a lower section below the upper section and having the port at the bottom thereof with the portion of the body interior space containing the valve member being between the fluid passageway sections so that when the tank fluid level reaches the predetermined maximum fill level during tank loading, the valve member falls in the body interior space portion toward the port and into the flow of fluid which assists in shifting the valve member to its blocking position for sealing the port and preventing further fluid loading into the tank interior.

In one form, the float assembly includes a cam that is pivoted as the tank fluid level changes. A valve stem is connected to the valve member at one end thereof and engaged with cam at the other end thereof. The float assembly, including the cam thereof, is operable to support the valve stem at fluid levels below a predetermined maximum fill level during both fluid loading and unloading operations to keep the valve member in the portion of the body interior space removed from the flow path.

In another form of the invention, the valve assembly includes a valve member for being shifted between open and closed positions, and a control member having an operative position for maintaining the valve member in the open position until a predetermined fluid level is reached and an inoperative position to allow the valve member to shift to the closed position at the predetermined fluid level. A float assembly is provided for rising and falling in substantial correspondence to the rising and falling of the fluid level in the vessel space, and an actuator of the fluid assembly shifts the control member at the predetermined fluid level to the inoperative position to allow the valve member to shift to the closed position and to prevent further fluid intake into the vessel.

A first biasing member can be provided for biasing the control member toward the operative position, and a second biasing member can be provided for biasing the valve member toward the closed position. The actuator shifts the control member to the inoperative position against the bias of the first biasing member which, in turn, allows the valve member to be rapidly shifted to the closed position under the influence of the bias of the second biasing member. In this manner, the control member allows the valve member to snap shut so that fluid intake in the vessel is rapidly and abruptly cut off at the predetermined fluid level as opposed to being more gradually cut off were the valve member to more slowly shift to its closed position.

In a preferred form, the control member is shifted in a first direction between the operative and inoperative positions, and the valve member is shifted in a second direction between its opened and closed positions that is transverse to the first direction.

The actuator can include a valve driving portion for driving the valve member toward the open position and a control member driving portion for driving the control member against its bias toward the inoperative position. Preferably, the valve member includes a biasing member for biasing the valve member toward the closed position and an elongate stem for being engaged by the actuator valve driving portion during vessel filling operations to hold the valve member in its open position against its bias and disengaging from the stem as the vessel space fills with fluid with the control member maintaining the valve member in the open position to allow filling operations to continue. Continued filling of the vessel space causes the actuator control member driving portion to drive the control member to its inoperative position allowing the valve member to rapidly shift to its closed position under the influence of the bias of its biasing member at the predetermined fluid level to provide a snap-shut valve for preventing further filling of the vessel space at the predetermined fluid level. Because the actuator valve driving and control member portions are not always in engagement with the respective valve member and control member during filling operations, the present valve assembly allows for oscillations of the float and thus the actuator thereof during filling operations without affecting operation of the valve member as by causing the valve member to shift.

Preferably, the valve assembly has a housing with at least one flow path therethrough for flow of fluid into the tank interior space and out therefrom so that both vessel filling and unloading operations occur via fluid flow through the valve assembly housing. In the preferred two-way valve assembly, the force of the valve biasing member is predetermined to allow the pressure differential between the vessel interior space and ambient to cause the valve member to shift from its closed position toward its opened position when the valve assembly is opened to begin vessel unloading operations.

The valve assembly housing preferably has an upper portion in which the valve member shifts and a lower portion to which the control member is mounted for shifting between its operative and inoperative positions independent of fluid forces generated by the fluid in the housing upper portion. Accordingly, unlike the previously-described prior valve assemblies having a pair of valve members which are both responsive to fluid forces in the valve assembly, the present invention has only a single valve member that is responsive to fluid forces in its housing, and operation of the control member is independent of these forces. In this manner, reliability of the present valve assembly is improved.

BRIEF DESCRIPTION OF THE DRAWINGS

FIG. 1 is an elevational view of an overflow protection valve assembly in accordance with the present invention shown attached to a service valve of an LP tank in the interior thereof;

FIG. 2 is an enlarged elevational view of the valve assembly threaded to the service valve showing a cam of a float assembly supporting a stem of a valve member in a valve housing of the assembly;

FIG. 3 is a sectional view of the valve assembly showing an interior space of the housing for providing a fluid passageway therethrough and including an inner diverter member rigidly attached therein in which the valve member is shifted by the cam pivotally mounted to the bottom of the housing;

FIG. 4 is an exploded perspective view of the valve assembly of FIG. 3;

FIG. 5 is a plan view of the diverter member showing the top closed end thereof and a plurality of recesses formed around the periphery providing flow paths for diverting incoming flow around the diverter member;

FIG. 6 is an elevational view of the diverter member showing a flow opening formed at the bottom of the flow paths;

FIG. 7 is a cross-sectional view of the diverter member taken along line 7—7 of FIG. 5;

FIG. 8 is a cross-sectional view of the diverter member taken along line 8—8 of FIG. 6;

FIG. 9 is a cross-sectional view of the diverter member taken along line 9—9 of FIG. 6;

FIG. 10 is a sectional view of the valve assembly housing and cam showing a tank loading operation with fluid flowing through the valve passageway and the peripheral flow paths thereof and out from a bottom port of the housing into the tank interior with the float assembly cam supporting the stem to keep the valve member in the diverter member;

FIG. 11 is a sectional view similar to FIG. 10 depicting the fluid level in the tank rising with the cam allowing the valve stem and valve member to drop downwardly toward a blocking position between the flow paths and port;

FIG. 12 is a sectional view similar to FIG. 10 depicting the tank as having reached its maximum fill level of fluid therein with the cam allowing the valve stem to fall so that the valve member is now in its blocking position between the flow paths and port preventing further fluid flow into the tank interior;

FIG. 17 is an enlarged elevational view partially in section of the valve assembly during a filling operation with the cam actuator disengaged from a stem of the valve member and the valve member held in its open position by the control member;

FIG. 18 is a view similar to FIG. 17 with the float pivoted to the maximum fill position and the cam actuator shifting the control member to allow the valve member to shift to its closed position for preventing further fluid intake into the vessel;

FIG. 19 is a view similar to FIG. 18 showing the float assembly pivoted slightly further above the maximum fill level to illustrate the over travel allowed by the control member; and FIG. 20 is a view similar to FIG. 19 showing the beginning of an unloading operation with the valve member shifted toward its open position due to the pressure differential between the vessel interior and ambient.

DETAILED DESCRIPTION OF THE PREFERRED EMBODIMENTS

Figure 13:
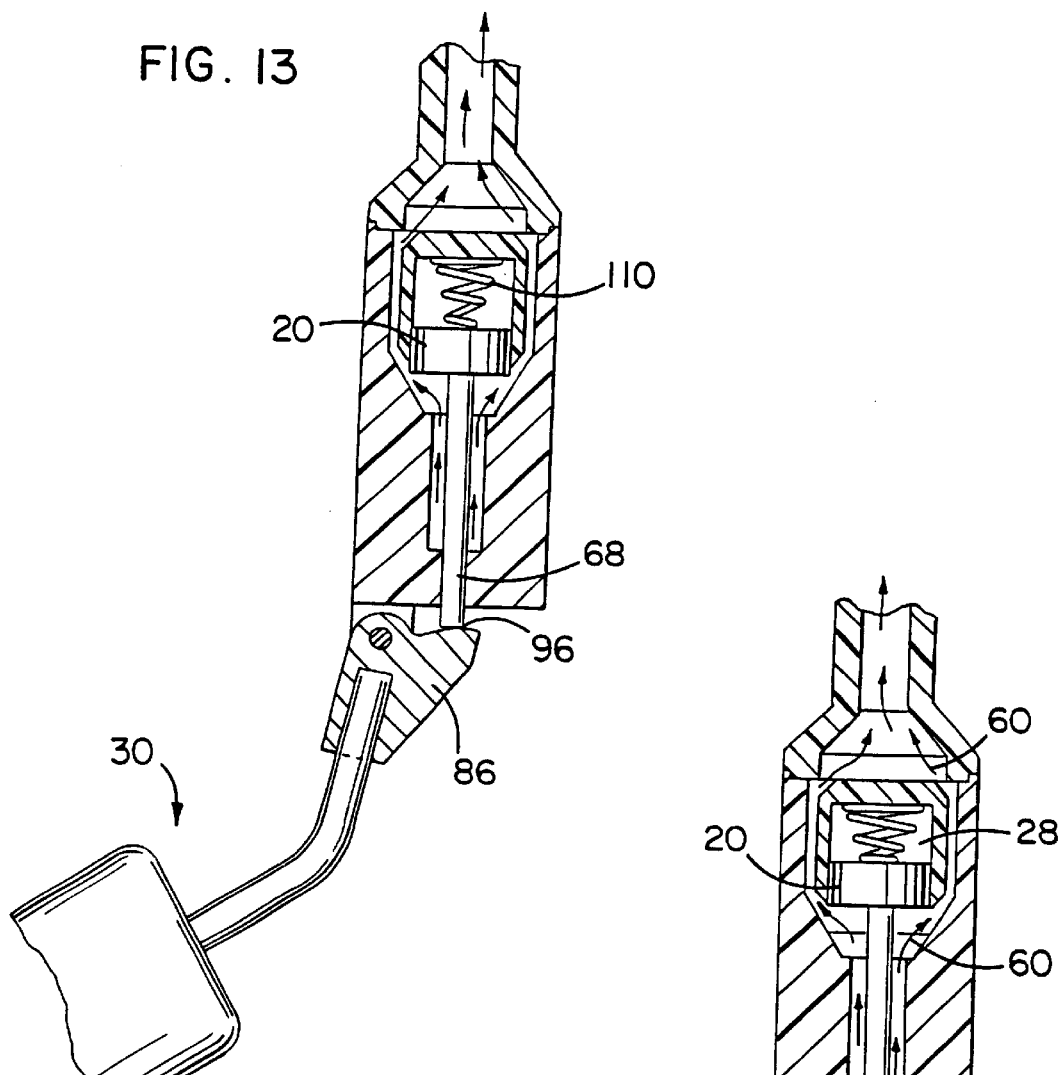
FIG. 13 is a sectional view similar to FIG. 10 showing a tank unloading operation with the fluid level in the tank receding and the cam pivoted to support the valve stem to hold the valve member in the diverter member removed from the blocking position.

In FIGS. 1–3, a valve assembly 10 is shown for use in preventing overfilling of vessels, such as a tank 12 for containing compressed or liquified gas under pressure in the interior 14 thereof. The valve assembly 10 is designed to permit fluid intake into the tank interior 14 in a filling or loading operation and discharge therefrom in an unloading operation. In this regard, the valve assembly 10 can be affixed to the service valve 16 provided for these functions as by a threaded connection 18 provided therebetween in the tank interior 14. The valve assembly 10 cuts off or blocks fluid intake into the tank 12 at a predetermined fluid level in the tank interior space 14 during tank filling operations. Where the tank 12 is an LP tank for containing liquified propane gas under pressure having, for example, a 20 lb. fluid weight capacity, the maximum fill level preferably is when the interior 14 is filled to eighty percent (80%) of its capacity or approximately 18 lbs. so that at least twenty percent (20%) remains as head space to provide a safety factor which may be necessary such as if the tank 12 is exposed to higher than normal external ambient temperatures.

The valve assembly 10 herein is a relatively simple, inexpensive device with a few number of moving parts so as to increase the reliability of its operation over repeated cycling. Reliability of the operation of the valve assembly 10 is of particular importance given its safety purpose, and the fact that it will be operative each time the tank 12 is loaded and each time it is unloaded. The preferred valve assembly 10 herein only has a single moving valve member 20 that can be shifted to cut off flow at the maximum fill level of the tank 12. The valve assembly 10 includes a fixed housing or body 22 thereof which defines an interior space 24 extending therethrough for providing a fluid passageway between the service valve 16 and the tank interior 14. One important advantage of the present valve assembly 10 is that the valve member 20 is normally removed from the flow of fluid through the fluid passageway formed in the interior space 24 during tank filling operations so as to provide a generally unimpeded passageway through the valve assembly 10. In other words, the flow of fluid from the service valve 16 into the tank interior 14 during filling operations will not encounter a shiftable valve member, such as valve number 20, during its flow through the valve housing 22.

For this purpose, the valve assembly 10 is provided with at least one flow path 26, and preferably a plurality of such flow paths 26 in the valve assembly housing 22 which redirect fluid flow around a portion 28 of the valve assembly interior space 24 during filling operations in which the valve member 20 is shifted. The shifting of the valve member 20 in the interior space portion 28 is controlled by a float assembly 30 that rises and falls with the fluid level in the tank interior 14. Until the fluid level in the tank 12 reaches the maximum fill level, the valve member 20 is maintained in the portion 28 of the housing interior space 24 by the float assembly 30 with flow redirected therearound via the flow paths 26. In this manner, the valve member 20 does not serve as an impediment to flow into the tank interior 14 out from port 32 of the housing 22 situated adjacent to and downstream from the flow paths 26 during tank filling operations. At the maximum fill level, the valve member 20 at that time is shifted to cut off or block flow out from the port 32. In this blocking position, at least a portion of the valve member 20 projects from the interior space portion 28 into the blocking position which is between the flow paths 26 and the adjacent port 32.

The preferred and illustrated valve housing 22 has an outer housing member 34 and an inner diverter member 36, as best seen in FIG. 4. In the preferred form, the outer housing member 34 has a cylindrical portion 38 and a guide portion 40 attached therebelow. The cylindrical portion 38 has an interior surface 42 having a substantially matching configuration to that of exterior surface 44 of the diverter member 36. To rigidly attach the diverter member 36 to the outer housing member 34, the housing member 34 has the diverter member 36 fit therein in tight fitting relation thereto due to the matching configurations of the respective surfaces 42 and 44. The valve housing 22 can also include a mounting member 46 having an upper cylindrical portion 48 having external threads 48a formed thereon and a lower flared-out conical portion 50 that is to be attached over the top of the outer housing member 34 and diverter member 36. Preferably, the outer housing member 34, diverter member 36, and mounting member 46 are all of a plastic material such as nylon 6/6 so that the mounting member 46 can be welded to the tops of the housing member 34 and diverter member 36 such as by spin welding or ultrasonic welding to keep the housing member 34 and diverter member 36 rigidly attached together with the mounting member 46 fixed over the top of the attached members 34 and 36.

The housing member 34, diverter member 36, and mounting member 46 assembled and rigidly attached together cooperate to form the valve assembly housing or body 22 having interior space 24 thereof which provides a fluid passageway via flow paths 26 for incoming fluid from service valve 16 and for outgoing fluid from tank interior 14. In this regard, the mounting member 46 is hollow and has an upper opening 52 for communicating with the interior of the service valve 16 for providing fluid flow between valve assembly interior 24 and the interior of the service valve 16. The service valve 16 can be of standard construction and includes a coupling socket 54 for being connected to a line for either loading liquified gas into the tank interior 14 from a pressurized liquified gas source or for unloading liquified gas preferably in vapor form from the tank interior 14 for use such as in a gas cooking grill. A handle knob 56 must be turned to open the passageway between the coupling 54 and the lower portion 58 of the service valve 16 that extends into the tank interior 14 into which the mounting member 46, and specifically the threaded cylindrical portion 48 thereof is threaded. The service valve 16 also includes a safety valve portion 60 which allows for the escape of gas in the event of over-pressure conditions in the tank interior 14.

Figure 14:
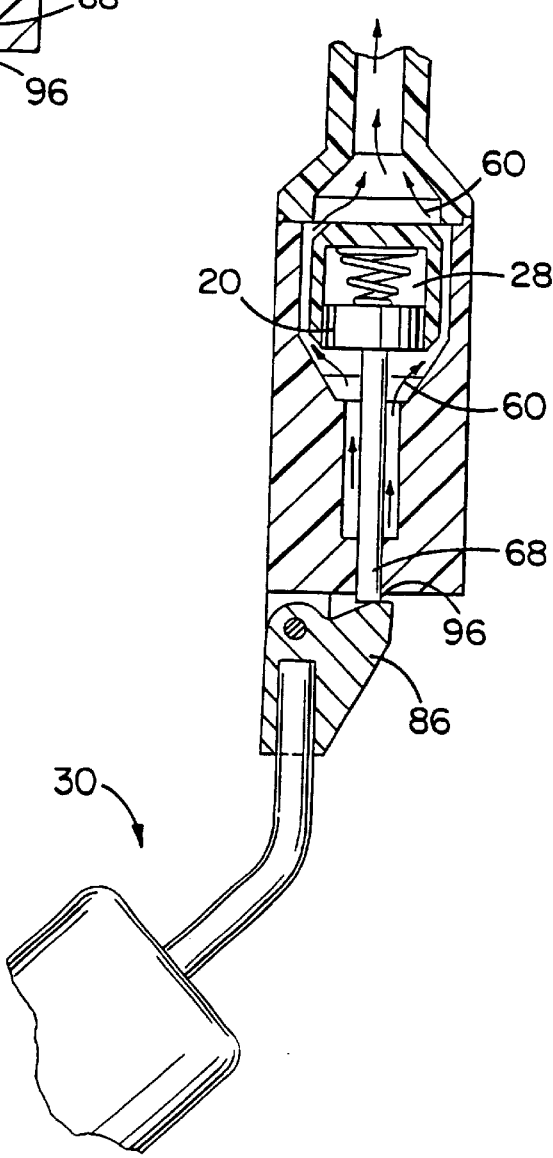
FIG. 14 is a sectional view similar to FIG. 10 showing the tank almost fully unloaded.

As shown in FIGS. 1 and 2, the service valve 16 is normally provided at the top of the tank 12 with the lower portion 58 thereof extending generally vertically into the tank interior 14 such that with the valve assembly 10 attached thereto by threaded connection 18, the valve assembly 10 will also extend generally vertically along the length of the attached mounting member 46 and housing member 34. The valve assembly interior space 24 defines a fluid passageway generally following arrows 60 depicting the flow of fluid therethrough as shown in FIGS. 10 and 11 (incoming flow), and FIGS. 13 and 14 (outgoing flow).

As previously discussed, during filling operations, the incoming fluid flows through fluid passageway interior space 24 and is directed by the diverter member 36 around valve member 20 contained therein. More specifically, the diverter member 36 has a chamber which defines the interior space portion 28 in which the valve member 20 is contained until the fluid level in the tank interior 14 reaches the maximum fill level, as previously described. The diverter member 36 has an annular wall 62 which includes an interior cylindrical guiding surface 64 in which the disk-shaped valve member 20 is guided for sliding movement thereagainst. The diverter member wall 62 is closed at its top end by top wall 66 and is open at its bottom end to allow a valve stem 68 to project downwardly out from the diverter member 36 and through the bottom port 32 of the housing member 34.

The diverter member outer surface 44 extends down from the periphery of the top wall 66 in a cylindrical manner and tapers inwardly at the bottom portion 70 thereof. The housing interior surface 42 also extends down from the top thereof in a cylindrical fashion to a tapered lower portion 72 such that with the housing member 34 having the diverter member 36 fit therein, the respective surfaces 42 and 44 will be in tight-fitting mating engagement with each other with the tapered surface portion 72 of the housing member 34 extending downwardly beyond the open end at the bottom of the tapered portion 70 of the diverter member 36 to form an inclined valve seat 74 around the port 32 at the bottom of the housing member 34.

The exterior of the housing member 34 has a generally cylindrical configuration to form the housing member cylindrical upper portion 38 in which the diverter member 34 is attached. The housing member lower guide portion 40 depends from the bottom of the housing cylindrical portion 38 and can have a generally flat bottom, U-shaped configuration with spaced vertical legs 78 and 80 interconnected by horizontal base 82 having a central guide orifice 84 by extending vertically therethrough.

The valve stem 58 has a length sufficient so that it projects through the port 30 out from the housing portion 38 down between the legs 78 and 80 and through the guide orifice 84 for being engaged by float assembly 30, and specifically cam member 86 thereof. Depending from the bottom of the base 82 aligned with leg 78 are a pair of spaced tabs 88 and 90 having respective mounting apertures 88a and 90a formed therein. The tabs 88 and 90 are spaced for receiving the cam member 86 therebetween and pivotally mounted thereto by pivot pin 92 inserted in the tab apertures 88a and 90a and through aligned mounting aperture 94 formed through the width of the cam member 86. With the cam member 86 pivotally attached to the valve housing 22, cam surface 96 will engage the bottom end 68a of the valve stem 68 so that pivoting of the cam member 86 controls the shifting of the valve member 20. As is apparent, the pivotal cam member 86 is disposed so that it is external of the housing portion 38 and the flow paths 26 therein so as not to interfere with fluid flow therethrough.

For pivoting the cam member 86, the float assembly 30 includes a float arm 98 that is attached at one end to the cam member 96 and at its other end to a float member 100. The float member 100 is formed of a material that will float on the pressurized liquid gas in the tank interior 14. One such material that has been found suitable for the float member 100 is a closed-cell polyurethane material. The float assembly 30, and specifically the float member 100 thereof, will rise with the liquid level during tank filling operations and will fall with the tank liquid level during tank unloading operations. The cam member 86 is pivoted by the rising and falling float member 100 causing the cam surface 96 to change its orientation with respect to the bottom end 68a of the valve stem for controlling shifting of the valve member 20 thereby. The valve stem 68, cam member 86, and float arm 98 are formed or coated with a non-corrosive material for withstanding exposure to the liquified gas contained in the tank interior 14. In this regard, a brass metal material has been found to be suitable for this purpose.

As previously discussed, peripheral flow paths 26 are provided in the housing interior space 24 so that incoming fluid can flow around the valve member 20 contained in the diverter member chamber 28 and out from port 30 into the tank interior 14 during filling operations. To form the flow paths 26 between the housing interior surface 42 and diverter member exterior surface 44, recessed channels 102 are formed in the diverter member exterior surface 44 so as to extend axially therealong. As shown, in FIGS. 5, 8, and 9, four such channels 102 define the flow paths 26 and are provided equally spaced around the periphery of the diverter member 34 at 90° increments. The channels 102 include a top beveled end 104 to provide for a smooth flow transition with flow coming down through the cylindrical portion 50 of the mounting member 46 and outwardly along flared conical wall 50a of bottom flared portion 50 and into the flow paths 26, as can be seen in FIGS. 5–7. When the flow is reversed and fluid is being unloaded from the tank interior 14, the beveled top end 104 directs flow out from the channels 102 and in a direction along the wall 50a up and out through the mounting member cylindrical portion 50.

Each of the channels 102 includes a beveled bottom end 106 (FIGS. 6, 7, and 9) extending inwardly and downwardly from the main recessed vertical surface 102a of the channels, and which terminates short of the bottom end of the exterior surface 44 so as to provide each of the recessed channels 102 with a flow opening 108 which directs incoming fluid flow out from the channels 102 and along the tapered lower portion 72 and out through port 30 into the tank interior 14 and which receives outgoing flow from the tank interior 14 therethrough and into the channels 102 for being directed out through the service valve 16. Between flow openings 108, depending tapered fingers 109 are formed at the bottom of the diverter member wall 62 extending past the ends of the channels 102.

Reference will be had next to FIGS. 10–14 to describe filling and unloading operations of the tank 12 utilizing the valve assembly 10 herein. Initially, it will be noted that a biasing member in the form of small coil spring 110 can be provided between the interior surface of the diverter member top wall 66 and the top surface of the valve member 20 for exerting a small biasing force in a downward direction toward the valve seat 74. In this manner, the valve member 20 is urged to its blocking position between the flow paths 26 and port 30.

As shown in FIG. 10, when the tank 12 is empty or has a very low fluid level, the cam surface 96 will be raised relative to the valve housing 22 which exerts an upward force on the valve stem 68 pushing the valve member 20 up into the chamber 28 against the spring bias provided by coil spring 110. In this manner, the valve member 20 is hidden or removed from the flow of fluid through the housing passageway, and specifically allows for incoming flow from flow paths 26 through the flow openings 108 and out through the port 30 into the tank interior 14.

FIG. 11 shows the float assembly 30 starting to rise up as the tank fluid level starts to rise with the cam member 86 pivoted in a clockwise direction so that the cam surface 96 is lowered with respect to the valve housing 22 which allows the valve member 20 to drop down in the chamber 28 under the influence of gravity and the small biasing force provided by spring 110. At the maximum fill level, the float assembly 30 has ascended beyond the position depicted in FIG. 11 so that the cam member 86 is pivoted slightly further in the clockwise direction to lower the cam surface 96 thereof relative to the valve housing 22 sufficiently so that the valve member 20 is in engagement with valve seat 74 in its blocking position between the flow paths 26 and the port 32. As the float assembly 30 rises during filling operations between the positions depicted in FIG. 11 and FIG. 12, the valve member 20 starts to project beyond the bottom of the diverter member inner surface 64 and into the area of the flow openings 108 with the valve member 20 being guided by diverter member fingers 109. Continued filling and rising of the float assembly 30 causes the valve member 20 to continue to move downward to progressively restrict and meter off flow through flow openings 108. As the valve member 20 is lowered into the area of the flow openings 108, the valve member 20 becomes entrained in the flow of fluid coming therethrough so that the fluid flow helps shift the valve member 20 down onto the seat 74 in its blocking position thereon. Thus, the valve member 30 is removed from the fluid flow during the majority of the tank filling operation, and then moves into the flow of fluid when the tank 12 nears its maximum fill level so as to assist in the downward shifting of the valve member 20 into sealing engagement on the seat 74 for cutting off further fluid flow into the tank interior 14.

To unload the tank 14, opening the service valve 16 to the ambient such as into a cooking grill line, allows the valve member 20 to be shifted slightly upward against the small spring force provided by spring 110 due to the pressure differential existing between the tank interior 14 and ambient pressures external thereof. The slight upward shifting of the valve member 20 creates a situation where the flow openings 108 leading to flow paths 26 are no longer completed blocked by valve member 20 so that fluid flows through the openings 102 into flow path channels 106 and up past the diverter member 34 to start to unload the tank 12 through the valve assembly 10 and service valve 16. As fluid continues to be unloaded from the tank interior 14, the float assembly 30 lowers pivoting the cam member 86 in a counterclockwise direction which raises the cam surface 96 thereof relative to the valve housing 22. This pushes the valve stem 68 vertically upward so that the valve member 20 clears the flow opening areas 108 for providing unimpeded flow into the flow paths 26 and out from the valve assembly 10 and service valve 16.

Based on the foregoing, it will be apparent that it is important for the valve member 20 to properly drop down and tightly engage the valve seat 74 when the liquid level reaches the maximum fill condition in the tank interior 14, as depicted in FIG. 12. In this regard, while it is also important to provide a good flow rate through the valve assembly 10 during filling operations into the tank interior 14, any excessive turbulence that develops in the fluid flow through the valve assembly 10 is to be avoided as that can negatively impact on the ability of the valve member 20 to move to its blocking position. Accordingly, the size of the recessed channels 102 is carefully controlled so that a sufficient flow rate is obtained into the tank interior 14 during filling operations while also allowing the valve member 20, preferably with a spring assist by spring 110, to drop onto the valve seat 74 at the predetermined maximum fill level. By way of example, the recessed channels 102 can be provided with a depth of 0.040 inch, and an axial length along the main vertical surface 102a of approximately 0.347 inch. The angle of the beveled top end 104 is preferably approximately 45° with the top end 104 spanning a vertical distance of 0.040 inch. The vertical distance of the diverter member tapered bottom portion 70 is approximately 0.156 inch to provide an axial length for the diverter member wall 62 of approximately 0.543 inch.

It has been found with the diverter member 34 and particularly the recessed channels 102 thereof having the above dimensions, an adequately high flow rate into the LP tank 12 can be achieved. In addition, the flow rate is controlled so that a relatively small spring force can be provided to overcome any turbulence that may be generated in the recessed channels 102, and specifically at the flow openings 108 thereof. In this regard, the spring force must be minimized so that the lever arm provided by the float assembly 30 can push the valve member 20 up into the diverter member 36 against the spring force during filling operations. With relatively small 12-inch diameter LP tanks and the service valve 16 and the attached valve assembly 10 being centrally mounted at the top of the tank 12, the length of the lever arm measured linearly between the pivot pin 94 and the distal end of the float member 100 is preferably between approximately 5 and 5½ inches in length. With such a small lever arm as afforded by the float assembly 30 herein due to the small LP tank diameter, the force exerted by the spring 110 on the top side of the valve member 20 cannot be so large that it would prevent the valve member 20 from being lifted from its blocking position on valve seat 74 during tank unloading operations. In this regard, a coil spring that exerts a force of approximately two grams when slightly compressed between the diverter member top wall 66 and valve member 20 has been found to be suitable to properly seat valve member 20 in its blocking position while allowing the float assembly 30 to pivot the cam member 86 lifting the valve stem 68 to shift the valve member 20 upwardly and into the diverter member chamber 28 during tank unloading operations.

Figure 15:
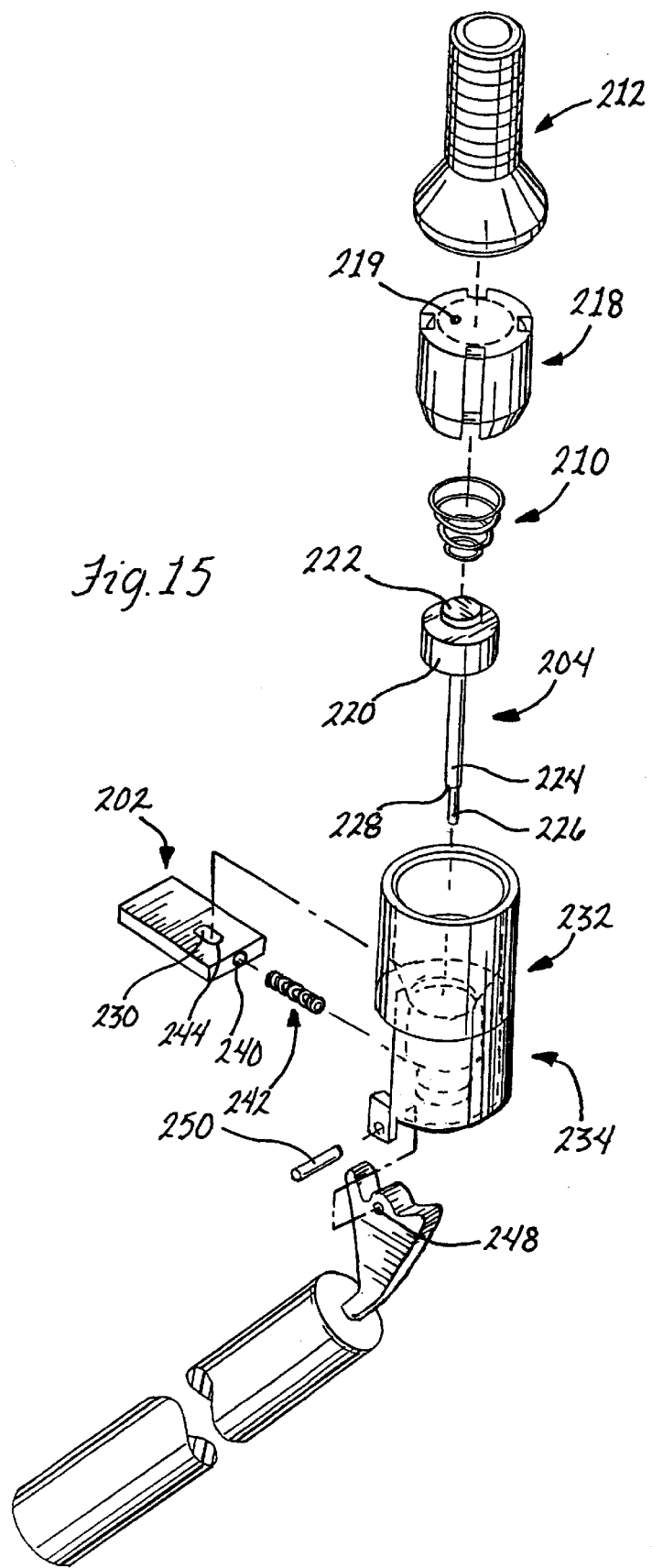
FIG. 15 is an exploded perspective view of another overflow protection valve assembly in accordance with the present invention showing a control member thereof for being mounted to a lower portion of the valve assembly housing.

Referring to FIG. 15, another overflow protection valve assembly 200 in accordance with the present invention is illustrated. The valve assembly 200 is termed a snap shut valve as the provision of a control member 202 allows its valve member 204 to rapidly shift to a closed position from an open position when the predetermined fluid level in the vessel interior space has been reached. In this regard, it is the control member 202 which maintains the valve member 204 in its open position as the fluid level in the vessel rises during filling operations as the actuator or cam 206 of float assembly 208 is not relied upon to hold the valve member 204 open. The actuator 206 drives the control member 202 from its operative position holding the valve member 204 open to an inoperative position at the predetermined fluid level to allow the valve member 204 to rapidly shift to the closed position under the influence of biasing member or spring 210. In this regard, it is possible for the spring 210 to provide a larger biasing force than spring 110 as the relatively small level arm that can be provided by the float assembly in an LP tank is not as significant of a concern where the float assembly is not relied upon to hold the valve member open.

The valve assembly 200 includes a diverter member 218 similar to that of valve assembly 10 except for the provision of a through passageway 219 in the top wall 218a thereof. The through passageway 219 provides a passageway for a small amount of fluid flow into the diverter member 218 in the space between the valve member 204 and the diverter top wall 218a during tank filling operations. Accordingly, when the tank is being filled, fluid forces will act on the backside of valve head 220 of the valve member 204 to urge it toward its closed position. And once the tank reaches its predetermined maxim fluid level and the control member 202 is shifted by the actuator 206 to its inoperative position, this backpressure along with the bias force of spring 210 will cause the valve head 220 to rapidly shift into flow path 214 which, in turn, rapidly shifts the valve head 220 down onto valve seat 221 to block fluid flow through the flow path 214 and out from outlet port 223 of upper housing portion 216. Because tank loading operations tend to take place at high filling rates of fluid flow into the tank, the use of the backpressure on the valve head 220 to shift it into the fast moving fluid in the flow path 214 which then shifts the valve head 220 onto the seat 221 will cause the valve head 220 to rapidly move to its closed position and snap shut over the outlet port 223.

The pressure on the head 220 generated primarily by fluid forces developed via through passageway 219 is desirable as the high flow rate through the flow path 214 during tank loading tends to keep the valve head 220 riding on the fast moving fluid rather than dropping down into the stream of fluid flow. Thus, the control member 202 allows for high backpressure to be developed on the valve head 220 during tank loading with the backpressure mechanisms described above before the tank is filled to its predetermined maximum fill level. This backpressure is used to rapidly move the valve head 220 into the flow of fluid through flow path 214 once the control member 202 is shifted to its inoperative position so that the head 220 does not ride on the fast moving fluid before dropping into the fluid stream for being snapped shut over outlet port 223 by way of the fluid forces in the flow path 214 pushing the valve head 220 onto valve seat 221.

The provision of the control member 202 also allows for oscillations of float member 211 in the tank interior space as it is being filled without causing corresponding oscillations or shifting of the valve member 204 and potential interruptions of fluid intake into the vessel space during filling operations, as will be described more fully hereinafter. In addition and as discussed, the control member 202 provides for a more precisely defined maximum fill level and rapid cutoff of fluid intake into the vessel at the maximum fill level as the valve member 204 does not gradually shift into the closed position. Instead, the valve member 204 is held open by the control member 202 which allows greater pressure to be placed on the back of the valve head 220 before the maximum fill condition in the tank is obtained as by being urged against the control member 202 by fluid forces in the diverter 218 via through passageway 219 thereof and the spring 210 so that when the control member 202 is shifted to its inoperative position, the valve member 204 shifts rapidly toward the closed position and into the flow of fluid through flow path 214 which drives the valve head 220 down onto its seat 221 to abruptly cut off fluid flow precisely at the predetermined fluid level. It has been found that with valve assembly 200, the maximum fill level will vary in the tank by only ±0.10 percent which is a significant improvement over the 1½ percent variation achieved by prior valve devices used for this purpose. It should also be noted that when the tank is unloaded, the fluid forces acting on the backside of the valve member 204 generated during tank loading will be removed so as not to affect the balance achieved between the back pressure of the smaller bias force provided by the spring 210 and the pressure differential between the tank interior and ambient which must be great enough to overcome the spring force for tank unloading to begin, as described herein.

Turning next to the details of the valve assembly 200, it has a threaded mounting member 212 similar to mounting member 46 of previously-described valve assembly 10 which allows the valve assembly 200 to be threaded to the bottom of a standard service valve already in place on an LP tank. It is also contemplated that the valve assemblies 10 and 200 described herein could be integrated into the service valve. As mentioned, the valve assembly 200 also is provided with at least one flow path 214 defined between the upper housing portion 216 and the inner diverter member 218 similar to corresponding housing portion 38 and inner diverter member 36 of valve assembly 10. As such, construction and operation of these portions of the valve assembly 200 will not be described in further detail hereinafter except as necessary for an understanding of the use of the control member 202 in the valve assembly 200 and other differences over valve assembly 10.

The valve member 204 is slightly modified over valve member 20 as annular head 220 thereof is provided with a smaller diameter pedestal portion 222 raised from the upper surface thereof to provide a seat for the bottom end of the coil spring 210. Valve stem 224 is also modified over valve stem 68 as it includes a reduced diameter end portion 226 projecting from the bottom thereof distal from the valve head 220. The provision of the reduced end portion 226 creates a transverse shoulder 228 at the juncture of the reduced portion 226 and the remainder of the stem 224. The control member 202 is provided with a through opening 230 through which the valve stem 224 can project.

The valve assembly 200 preferably includes a housing 232 therefor. The housing 232 includes the upper housing portion 216 and a lower housing portion 234 to which the control member 202 is mounted. As the control member 202 is removed from the upper housing portion 216, the shifting thereof is not affected by fluid forces generated in the flow paths 214 defined through the housing portion 216. The float assembly 208 and specifically cam actuator 206 thereof are also pivotally mounted to the housing portion 234. The lower housing portion 234 can have a generally outer cylindrical wall 236 and an inner cylindrical wall 238. The wall 238 is provided with a lateral slot 239 in which the control member 202 is mounted for shifting between its operative and inoperative positions in a direction that is transverse to the vertical shifting of the valve member 204 between its open and closed positions.

In the preferred and illustrated form, the control member 202 has a plate-like configuration and has a small mounting aperture 240 formed at one end 241 thereof for receiving one end of a biasing member or spring 242 therein. The other end of the spring 242 sits against the inner surface of the outer wall 236 and biases the control member 202 to its operative position. In the operative position, the control member 202 is disposed so that edge 244 on one side of the through opening 230 is directly below the shoulder 228 of the valve stem 224 so that it can be seated thereagainst. Thus, only reduced portion 226 of the stem 224 can project into and through the opening 230 with the control member 202 in the operative position as the remainder of the stem 224 is maintained thereabove. The valve stem 224 is sized so that when its shoulder 228 abuts against the control member edge 244 with the control member 202 in its operative position, the valve head 220 will be in its open position in the diverter member 218, as described with respect to valve assembly 10. With the valve head 220 held in the open position in the diverter member 218, substantially unobstructed fluid flow through valve assembly 200 and the flow paths 214 can occur such as during vessel filling or unloading operations.

The cam 206 of the float assembly 208 is modified over cam 86 of valve assembly 10 in that it includes both a valve driving portion 246 on one side of its aperture 248 for pivot pin 250 and a control member driving portion 252 on the other side of the pivot pin aperture 248. Thus, the driving portions 246 and 252 are on opposite sides of the pivot point for the cam actuator 206 so that they move in generally opposite pivoting directions as the float assembly 208 rises and falls with changing fluid levels in the tank. When the float assembly 208 and specifically float member 210 is pivoted downwardly due to low fluid levels in the tank, the valve driving portion 246 of the cam actuator 206 is caused to rise toward the bottom of the valve stem 224 projecting through the control member opening 230 and past bottom wall 254 of the valve assembly housing lower portion 234. On the other hand, when the fluid level in the tank starts to rise and the float member 211 correspondingly rises therewith, the cam actuator 206 pivots about pin 250 lowering the valve driving portion 246 thereof away from the bottom of the valve stem 224 with the control member driving portion 252 pivoted toward the end 256 of the control member 202 opposite the end 241 to which spring 242 is mounted. The control member driving portion 252 preferably is configured to project higher than the aperture 248 and thus its pivot point and slightly higher relative to the valve driving portion 246 so that the portion 252 can reach the control member 202 which is generally disposed above the bottom of the stem 224. In this manner, when the float member 211 has risen to the predetermined fluid level, the driving portion 252 will engage and push the control member end 256 against the bias afforded by its spring 242 to release the valve member 204 for being snapped shut, as described more fully hereinafter.

Figure 16:
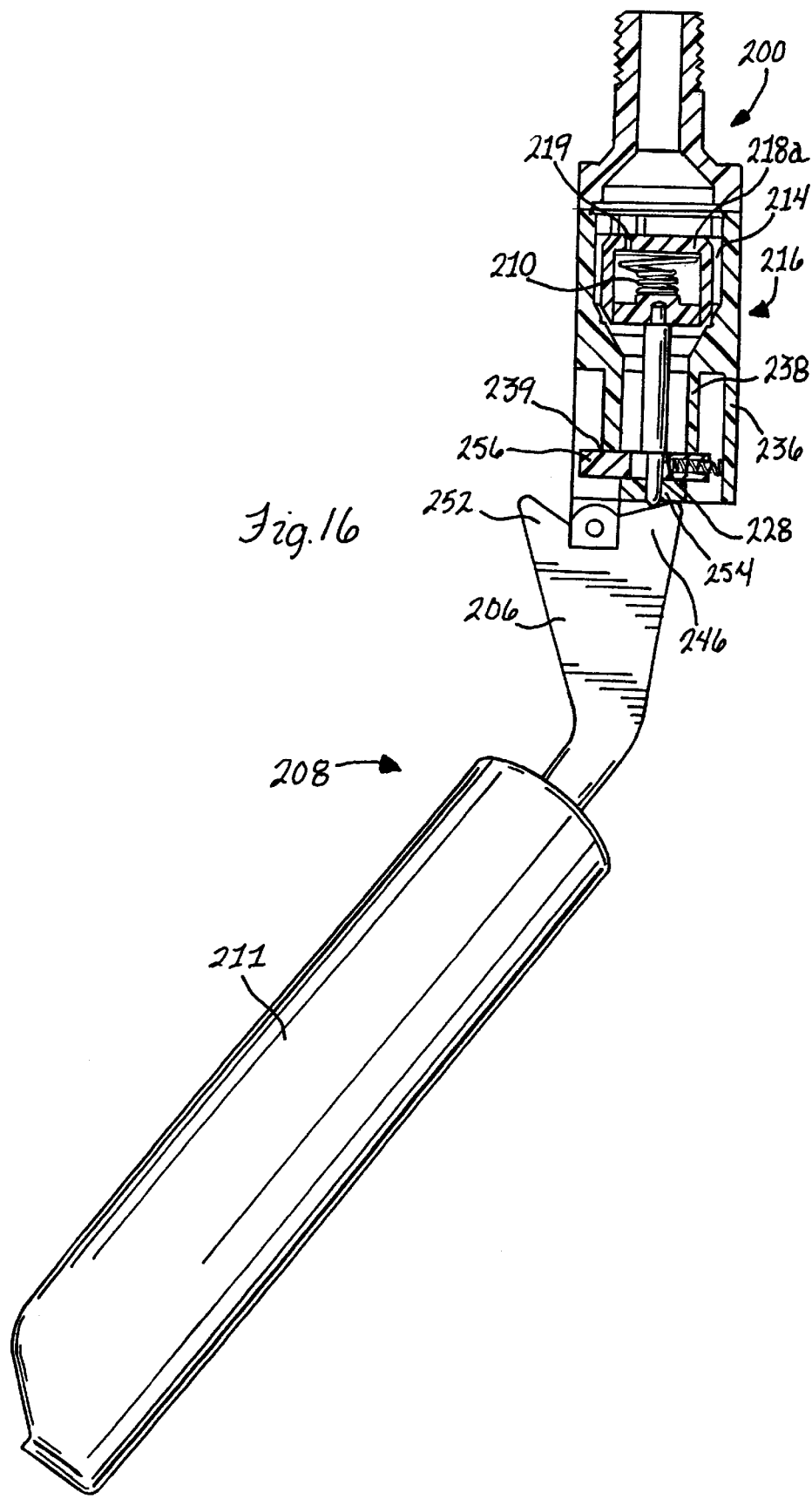
FIG. 16 is an elevational view partially in section of the valve assembly of FIG. 15 showing the valve member in its open position and the float assembly including cam actuator thereof pivoted to a low fluid level position.

Reference will be had next to FIGS. 16–20 for more specifically describing operation of the valve assembly 200. FIG. 16 shows the condition of the valve assembly 200 when the fluid in the vessel or LP tank is at low levels or empty. In this condition, the float assembly 208 is pivoted in a counter-clockwise direction so that valve driving portion 246 is raised relative to control member driving portion 252 and into engagement with the bottom of the valve stem 224, and specifically the bottom of reduced portion 226 thereof. This engagement of the cam portion 246 with the bottom of the stem 224 drives the head 220 of the valve member 204 into the diverter member 218 against the bias provided by spring 210 to its open position removed from the flow path 214 and the flow of fluid therethrough. In the open position, the valve stem 224 is disposed so that its shoulder 228 is above or aligned with the top of the lateral slot 239 formed in the lower housing portion 234. In the operative position, the control member 202 is disposed so that the edge 244 about through opening 230 is under the valve stem shoulder 248 for maintaining the valve member 204 in its open position against the back pressure on the valve head 220 tending to urge it closed. Accordingly, unlike the valve assembly 10, the valve assembly 200 does not rely exclusively on the force provided by the lever arm due to pivoting of the float assembly 208 to hold the valve member 204 in its open position.

FIG. 17 shows the condition of the valve assembly 200 as a filling operation commences with the flow of fluid through the valve assembly 200 indicated by arrow 258. The filling operation causes the level of fluid in the tank to rise relative to the empty condition of FIG. 16 so that the float assembly 208 is pivoted clockwise as the float member 210 rises with the fluid level. Pivoting of the float member 211 causes the cam actuator 206 to likewise pivot about its pivot pin 250 lowering the valve driving portion 246 and raising the control member driving portion 252 relative thereto. As can be seen, the valve driving portion 246 is lowered so as to disengage from the bottom of the valve stem reduced portion 226. Despite this disengagement, the valve member 204 is held in its open position by the control member 256 which remains in its operative state as the control member driving portion 252 has not yet reached driving engagement therewith. Accordingly, at this intermediate fluid level range, both the valve and control member driving portions 246 and 252 of the cam actuator 206 are disengaged from the valve stem 224 and control member 202, respectively. In this manner, any oscillations of the float assembly 208 such as may occur should the tank be tipped or rocked during filling as might cause waves or the like in the fluid will not affect the operation of the valve assembly 200 as there is some play in terms of when the cam actuator driving portions 246 and 252 engage their respective driven members, i.e., valve stem 224 and control member 202.

FIG. 18 depicts the condition of the valve assembly 200 at the maximum fill condition where the fluid in the tank is at the predetermined fluid level at which further filling operations are to be prevented. As shown, the float assembly 208 is pivoted further clock-wise as the float member 211 has risen with the fluid level to the maximum fill condition. In this position, the cam actuator 206 is pivoted so that the control member driving portion 252 is raised further and pivoted into engagement with the control member end 256 and has urged the control member 202 against the bias afforded by spring 242 sufficiently far so that the edge portion 244 thereof clears the valve stem shoulder 228. At this point, the control member 202 has been shifted to its inoperative position. Because the through opening 230 is sized larger than the diameter of the valve stem 224 above the reduced portion 226, this allows the valve member 204 to drop to its closed position out from the diverter member 218 under the influence of the fluid forces as generated by fluid pressure build-up against the back side of the valve head 220 and the bias provided by spring 210.

In this manner, the valve member 204 is not gradually shifted from its open position to its closed position such as with valve member 20 where its valve stem 68 generally stays in constant engagement with cam surface 96 of the cam member 86 so that shifting of the valve member 20 tracks shifting of the float assembly 30. In the valve assembly 200, the control member 202 keeps the valve member 204 in its open position so that as the fluid level in the tank rises causing the float assembly 208 to pivot and rise therewith, the valve member 204 does not shift. In fact, the valve driving portion 246 of the cam actuator 206 separates from engagement with the valve stem 224 (FIG. 17), and the control member 202 keeps the valve member 204 in the open position. However, once the fluid level has reached the predetermined maximum fill level with the float assembly 208 pivoted as shown in FIG. 18, the control member driving portion 252 of the cam actuator 206 will drivingly engage the end 256 of the control member 202 to shift it against the bias provided by spring 242. As it is only the edge 244 of the control member 202 about its through opening 230 that holds the valve member 204 in its open position due to the engagement with stem shoulder 228 thereof, it only takes a slight amount of shifting of the control member 202 approximately equal to the radius of the valve stem shoulder 228 to free the valve member 204 for being shifted to the closed position. As mentioned, there is no gradual shifting of the valve member 204 as the float assembly 208 pivots since the control member 202 holds it in the open position against the fluid pressure and bias provided by the compressed, loaded spring 210 as described above; however, once the predetermined fluid level is reached, the valve member 204 will snap shut as by rapidly shifting to the closed or blocking position as the fluid pressure causes the valve head 220 to move into the stream of fluid flow in flow path 214 and the spring 210 decompresses, as shown in FIG. 18. Accordingly, the valve assembly 200 provides for a distinct cut off of fluid flow at a precisely defined predetermined maximum fluid level in the LP tank.

As previously mentioned, the through opening 230 formed in the control member 202 for the valve stem 224 is sized to be larger than the diameter of the stem 224. In particular, the through opening 230 is preferably enlarged laterally so as to have an oblong shape to allow for some over travel of the control member 202 as driven by the driving portion 252 of the cam actuator 206. In this manner, should the fluid level in the tank exceed the maximum fill level such that the float assembly 208 is pivoted further upwardly from the FIG. 18 position, there will be room for the control member 202 to be shifted against its spring bias before edge 258 of the control member 202 about the opening 230 opposite edge 244 engages the valve stem 224, and the end 241 of the control member 202 engages the lower housing portion wall 236, as shown in FIG. 19. The enlarged sizing of the through opening 230 also ensures that there will be little possibility of binding of the valve stem 224 as it is shifted downwardly from the open position in the diverter to the closed position blocking fluid flow through flow path 214 of the valve assembly 200.

After the tank has been filled and the valve member 204 is in the closed position, fluid flow out from the tank through the valve assembly 200 as indicated by arrow 260 in FIG. 20 is achieved by opening the service valve and thus the valve assembly 200 to the ambient, as described with respect to valve assembly 10. In this regard, the pressure differential between the interior of the tank and ambient is sufficient to shift the valve member 204 back toward its open position so that fluid can flow through the flow paths 214 and out from the tank. In addition, the valve member 204 shifts sufficiently far upwardly during tank unloading so that the stem shoulder 228 is aligned with or above the top of the housing slot 239 for the control member 202. This allows the control member 202 to be biased back to its operative position. In this regard, the spring force provided by spring 210 is redetermined to allow for such shifting of the valve ember 204 to occur. Accordingly, while the spring 210 can be larger than the spring 110 used in valve assembly 10 due to the provision of the control member 202 holding it in its open position as previously described, the spring force provided by spring 210 cannot be so large to prevent the valve head 220 from unseating from its closed position when the valve assembly 200 is open to ambient. In other words, it is the pressure differential between ambient and the loaded tank that governs the sizing of the spring 210 and other operative portions of the valve assembly 200.

Once the fluid level has receded to a point where the float assembly 208 is pivoted counter-clockwise from the maximum fill position as shown in FIG. 20, the control member driving portion 252 will be pivoted away from the control member 202 to allow it to be biased by its spring 242 toward its operative position. Because the valve driving portion 246 of the cam actuator 206 is not in engagement with the bottom of the valve member stem 224, once the tank service valve is closed, the control member 202 now in its operative position will prevent the valve member 204 from dropping to its closed position.

Another advantageous feature of the valve assemblies 10 and 200 described herein is the lack of O-ring seals, rubber gaskets and the like required for limiting leakage as none are necessary for proper functioning of the present valve assemblies 10 and 200. Thus, the plastic parts used in these valve assemblies can include a reinforcement material such as by being glassfilled that would not otherwise be feasible were resilient O-rings included. This is due to the abrasive quality of glass-filled materials at the contacting surfaces which would tend to wear away the rubber of any seals incorporated in the valve assemblies. Since no such seals are necessary, it has been found that glass impregnated or filled plastics can be used to improve the strength and durability of the plastic parts of the valve assemblies 10 and 200 herein.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A valve assembly for permitting fluid intake into an interior space in a vessel at pressures greater than ambient in a vessel filling operation and fluid discharge therefrom in a vessel unloading operation and for cutting off fluid intake into the vessel at a predetermined fluid level in the vessel space during filling operations, the valve assembly comprising:

a valve member for being shifted between open and closed positions;

a control member having an operative position for maintaining the valve member in the open position until the predetermined fluid level is reached and an inoperative position to allow the valve member to shift to the closed position at the predetermined fluid level;

a float assembly distinct from the control member for rising and falling in substantial correspondence to the rising and falling of the fluid level in the vessel space; and an actuator of the float assembly for shifting the control member at the predetermined fluid level to the inoperative position to allow the valve member to shift to the closed position and prevent further fluid intake into the vessel, the control member being in the operative position at fluid levels other than at the predetermined fluid level during both filling and unloading operations, the valve member shifting to the open position in response to the pressure differential between the vessel interior and ambient when the vessel is at the predetermined fluid level and opened to ambient independent of movement of the float assembly to begin vessel unloading operations.

2. The valve assembly of claim 1 wherein the control member includes a first biasing member for biasing the control member toward the operative position, and the valve member includes a second biasing member for biasing the valve member toward the closed position with the actuator shifting the control member to the inoperative position against the bias of the first biasing member to allow the valve member to be rapidly shifted to the closed position under the influence of the bias of the second biasing member.

3. The valve assembly of claim 1 wherein the control member is shifted in a first direction between the operative and inoperative positions, and the valve member is shifted in a second direction between its open and closed positions transverse to the first direction.

4. The valve assembly of claim 1 wherein the control member includes a biasing member for biasing the control member to the operative position, and the actuator includes a valve driving portion for driving the valve member toward the open position and a control member driving portion for driving the control member against its bias toward the inoperative position.

5. The valve assembly of claim 4 wherein the valve member includes a biasing member for biasing the valve member toward the closed position and an elongate stem for being engaged by the actuator valve driving portion during vessel filling operations to hold the valve member in its open position against its bias and disengaging from the stem as the vessel space fills with fluid with the control member maintaining the valve member in the open position to allow filling operations to continue, and continued filling of the vessel space causing the actuator control member driving portion to drive the control member to its inoperative position allowing the valve member to rapidly shift to its closed position under the influence of the bias of its biasing member at the predetermined fluid level to provide a snap shut valve for preventing further filling of the vessel space at the predetermined fluid level.

6. The valve assembly of claim 1 including a housing having at least one flow path therethrough for the flow of fluid into the tank interior space and out therefrom so that both vessel filling and unloading operations occur via fluid flow through the valve assembly housing.

7. The valve assembly of claim 6 wherein the valve member includes a biasing member for biasing the valve member toward its closed position with a force that is predetermined to allow the pressure differential between the vessel interior space and ambient to cause the valve member to shift from its closed position toward its open position when the valve assembly is opened to ambient to begin vessel unloading operations.

8. The valve assembly of claim 1 including a housing for containing the valve member and defining at least one flow path therethrough with the flow path directing fluid flow through the housing during vessel filling operations so that the valve member does not serve as an impediment to flow of fluid through the valve assembly during filling operations.

9. The valve assembly of claim 1 including a housing having an upper portion in which the valve member shifts and defining a flow path therethrough for vessel filling operations, and a lower portion to which the control member is mounted for shifting between its operative and inoperative positions independent of fluid forces generated by the fluid in the housing upper portion.

10. The valve assembly of claim 9 wherein the housing includes a portion separate from the flow path in which the valve member is shifted to its open position so that the valve member does not serve as an impediment to fluid flow through the flow path during vessel filling operations, and the valve member shifts out of the housing portion and into the closed position at the predetermined fluid level with the fluid forces generated by the flow of fluid pushing the valve member toward the closed position.

11. The valve assembly of claim 1 including a housing for containing the valve member and defining at least one flow path therethrough and having an outlet port which communicates with the flow path with the valve member in its open position, and a back pressure mechanism for urging the valve member toward the closed position against the control member in its operative position, and with the control member shifted to its inoperative position rapidly shifting the valve member into the flow path to be snapped shut over the outlet port for providing a precisely defined fluid intake cutoff at the predetermined fluid level.

12. The valve assembly of claim 11 wherein the housing includes a diverter in which the valve member is held during tank loading and unloading operations with the flow path being about the diverter member, and the back pressure mechanism includes a through passageway in the diverter to allow fluid pressure build-up in the diverter against the valve member to urge it toward its closed position.

13. The valve assembly of claim 12 wherein the housing and diverter are formed of a reinforced plastic material.

14. The valve assembly of claim 13 where in the reinforced plastic material is a glass-filled plastic material.

15. A valve assembly for permitting fluid intake into an interior space in a vessel at pressures greater than ambient in a vessel filling operation and fluid discharge therefrom in a vessel unloading operation and for cutting off fluid intake into the vessel at a predetermined fluid level in the vessel space during filling operations, the valve assembly comprising:

a valve member for being shifted between open and closed positions;

a control member having an operative position for maintaining the valve member in the open position until the predetermined fluid level is reached and an inoperative position to allow the valve member to shift to the closed position at the predetermined fluid level;

a float assembly distinct from the control member for rising and falling in substantial correspondence to the rising and falling of the fluid level in the vessel space; and an actuator of the float assembly for shifting the control member at the predetermined fluid level to the inoperative position to allow the valve member to shift to the closed position and prevent further fluid intake into the vessel;

wherein the control member includes a first biasing member for biasing the control member toward the operative position, and the valve member includes a second biasing member for biasing the valve member toward the closed position with the actuator shifting the control member to the inoperative position against the bias of the first biasing member to allow the valve member to be rapidly shifted to the closed position under the influence of the bias of the second biasing member, the valve member shifting to the open position in response to the pressure differential between the vessel interior and ambient when the vessel is at the predetermined fluid level and opened to ambient independent of movement of the float assembly to begin vessel unloading operations.

16. A valve assembly for permitting fluid intake into an interior space in a vessel at pressures greater than ambient in a vessel filling operation and fluid discharge therefrom in a vessel unloading operation and for cutting off fluid intake into the vessel at a predetermined fluid level in the vessel space during filling operations, the valve assembly comprising:

a valve member for being shifted between open and closed positions;

a control member having an operative position for maintaining the valve member in the open position until the predetermined fluid level is reached and an inoperative position to allow the valve member to shift to the closed position at the predetermined fluid level;

a float assembly distinct from the control member for rising and falling in substantial correspondence to the rising and falling of the fluid level in the vessel space;

an actuator of the float assembly for shifting the control member at the predetermined fluid level to the inoperative position to allow the valve member to shift to the closed position and prevent further fluid intake into the vessel; and a housing for containing the valve member and defining at least one flow path therethrough with the flow path directing fluid flow through the housing during vessel filling operations so that the valve member does not serve as an impediment to flow of fluid through the valve assembly during filling operations, the valve member shifting to the open position in response to the pressure differential between the vessel interior and ambient when the vessel is at the predetermined fluid level and opened to ambient.

* * * * *